United States Patent [19]

Wellington

[11] 4,218,327

[45] Aug. 19, 1980

[54] STABILIZING THE VISCOSITY OF AN AQUEOUS SOLUTION OF POLYSACCHARIDE POLYMER

[75] Inventor: Scott L. Wellington, Houston, Tex.

[73] Assignee: Shell Oil Company, Houston, Tex.

[21] Appl. No.: 903,279

[22] Filed: May 5, 1978

Related U.S. Application Data

[63] Continuation-in-part of Ser. No. 673,518, Apr. 5, 1976, abandoned.

[51] Int. Cl.² .................................................. C09K 3/00
[52] U.S. Cl. ........................... 252/8.55 D; 252/8.55 R; 166/246
[58] Field of Search ............... 252/8.55 D, 8.55 R, 252/402, 406, 316; 166/273, 274, 275, 308, 246; 536/114

[56] References Cited

U.S. PATENT DOCUMENTS

| | | | |
|---|---|---|---|
| 3,343,601 | 9/1967 | Pyre | 166/275 |
| 3,676,494 | 7/1972 | Biland et al. | |
| 3,801,502 | 4/1974 | Hitzman | 252/8.55 D |
| 3,966,618 | 6/1976 | Colegrove | 252/8.55 D |
| 4,141,842 | 2/1979 | Abdo | 252/8.55 D |

*Primary Examiner*—Benjamin R. Padgett
*Assistant Examiner*—J. L. Barr

[57] ABSTRACT

In an oil recovery process in which an aqueous solution thickened with a water-soluble anionic polysaccharide polymer (Xanthan gum polymer) is injected into a subterranean reservoir, the stability of the solution viscosity is improved by de-oxygenating the aqueous liquid and then adding a sulfur-containing antioxidant, a readily oxidizable water-soluble alcohol or glycol and the Xanthan gum polymer.

16 Claims, 1 Drawing Figure

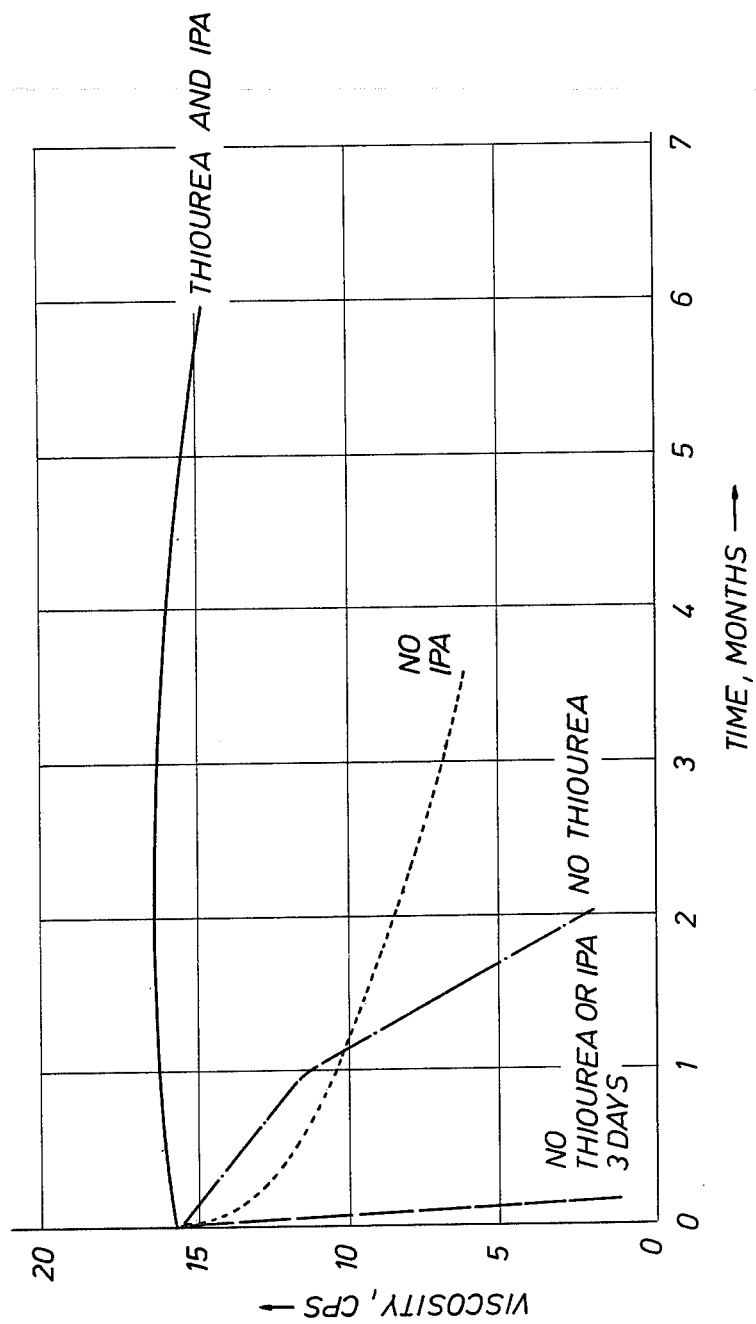

STABILIZING THE VISCOSITY OF AN AQUEOUS SOLUTION OF POLYSACCHARIDE POLYMER

CROSS-REFERENCE TO RELATED APPLICATION

This application is a continuation-in-part of application Ser. No. 673,518 filed Apr. 5, 1976, now abandoned, the pertinent portions of the disclosure of which are incorporated herein by cross-reference.

BACKGROUND OF THE INVENTION

The invention relates to an oil recovery process in which an aqueous solution which contains enough water-soluble anionic polysaccharide polymer to reduce its mobility is injected into a subterranean reservoir to displace fluid toward a production well or production location.

With respect to such oil recovery processes, it is known to use water-soluble anionic polysaccharide polymers as the mobility reducing agents. Various modifications of such polymers or solutions have been suggested. For example, U.S. Pat. No. 3,208,518 suggests that the pH of such a polymer solution be reduced to reduce the solution viscosity during injection and then be allowed to rise to increase the viscosity within the reservoir. U.S. Pat. No. 3,343,601 suggests that flood water be deoxygenated by adding a water-soluble hydrosulfite before or after adding a water-thickening polymer. U.S. Pat. No. 3,581,824 suggests that, within the reservoir, such a polymer solution be contacted with an aqueous solution of relatively high divalent cation concentration to cause agglomeration of the polymer for selectively plugging portions of the reservoir. U.S. Pat. No. 3,676,494 describes how to make novel sulfur-containing aromatic carboxylic acid amides and indicates that they can stabilize oxygen-sensitive organic materials against oxidation. U.S. Pat. No. 3,801,502 suggests that the viscosity increasing capability of Xanthan gum polymers be increased by adding, to their fermentation broths or effluents, various materials, inclusive of water-soluble alcohols. In SPE Paper No. 5372 presented at the April 1975 meeting in Ventura, California, and in U.S. Pat. No. 3,966,618, it is suggested that the filtration properties of Xanthan gum polymer solutions be improved by treating them with enzymes that solubilize the cellular debris of the bacterially-produced polymer.

SUMMARY OF THE INVENTION

This invention relates to a process, such as an oil recovery process, in which an aqueous solution thickened with a water-soluble Xanthan gum polymer is flowed into a relatively remote location, such as a subterranean reservoir, where the solution viscosity may be decreased by a relatively long exposure to a relatively high temperature. The aqueous liquid to be used is first treated to remove substantially all dissolved oxygen, and then, at least one each of a sulfur-containing antioxidant, an easily oxidized water-soluble alcohol or glycol, and the water-soluble Xanthan gum polymer are added to the de-oxygenated liquid.

DESCRIPTION OF THE DRAWING

The drawing shows a graph of viscosity with time of polysaccharide polymer-thickened solutions with and without antioxidant and alcohols.

DESCRIPTION OF THE INVENTION

The chemical composition of the water-soluble anionic polysaccharide polymers (or Xanthan gums) which are effective as water-thickening agents is such that the polymers are susceptible to chemical degradation or depolymerization. The degradation, which tends to increase with increasing temperature, reduces the viscosity of a solution containing the polymers. Two paths by which such a degradation can occur comprise hydrolysis and free-radical reactions. The hydrolysis reaction involve the reaction of molecules of water with the ether-type linkages in the structure of the polysaccharide polymer. The free-radical reactions are usually those initiated when the polymer solution is mixed with air or oxygen. Such a mixture tends to form hydroperoxides and the decomposition of the hydroperoxides produces reaction-initiating free-radicals that propogate polymer-degrading radical reactions.

Numerous types of materials and techniques for treating aqueous solutions to remove dissolved oxygen are known to those skilled in the art. In general, such treatments are effected by or completed by dissolving a strong reducing agent (or oxygen scavenger) in the solution. In a solution in which a radical degradable polymer is present, a combination of oxygen and oxygen scavenger creates an oxidation reduction couple or redox system. Since free-radical reaction initiating radicals are intermediate products of the reaction between the oxygen scavenger and the oxygen, the reactions are such that, although the system will remove the oxygen, it will also degrade the polymer.

The aqueous liquid used in the present process can be substantially any fresh or saline water but is preferably a relatively soft and not extensively saline water. Such a water preferably has a total dissolved salt content of not more than about 50,000 ppm and a hardness (in terms of parts per million of calcium ions) of not more than about 5,000 ppm. When deoxygenated for use in the present process, such a water is preferably substantially completely free of dissolved oxygen and its total dissolved salt content includes from about 10 to 100 parts per million $SO_3$-group-containing oxygen scavenger (in terms of $SO_3$-group equivalent).

Water-soluble inorganic compounds that contain or form ions that contain an $SO_3$-group are particularly suitable oxygen-scavengers for use in the present process. Such compounds include water-soluble alkali metal sulfites, bisulfites, dithionites, etc. As known to those skilled in the art, such an oxygen scavenger is preferably used in a slight stoichiometric excess (relative to the amount needed to remove substantially all of the dissolved oxygen in the solution being treated). Such an excess is preferably from about 10 to 500% more than stoichiometric. And, where a significant excess is used, the oxygen-scavenger is preferably an alkali metal sulfite or bisulfite.

The sulfur-containing antioxidant used in the present process can comprise substantially any such water-soluble antioxidant composition (transfer agent, terminator, peroxide decomposer) which is effective with respect to decomposing peroxides in aqueous solutions, and is capable of protecting a Xanthan gum polymer solution from drastic loss of viscosity due to being boiled at atmospheric pressure for about five minutes. Examples of such compounds include relatively water-soluble mercaptans, thioethers, thiocarbanols, and the like. Particularly suitable examples are thiourea, thiodiacetic acid (thiodiglycolic acid), 3,3'-thiodiacetic acid (dithiodiglycolic acid) and their water-soluble homologues.

Suitable readily oxidizable alcohols or glycols for use in the present process include substantially any water-soluble primary and secondary alcohols or glycols that are easily oxidized, and are capable of protecting a Xanthan gum polymer solution from drastic loss of viscosity due to being boiled at atmospheric pressure for about five minutes. Examples of such compounds include methanol, ethanol, allyl alcohol, isopropyl alcohol, isobutyl alcohol, ethylene glycol, and the like.

A "boiling test" provides a convenient means of identifying antioxidants or readily-oxidizable alcohols or glycols which are capable of protecting a Xanthan gum polymer solution from drastic loss of viscosity due to being boiled at atmospheric pressure for five minutes. In the boiling test the viscosity, of a solution containing about 800 ppm of each of: the additive being tested, Xanthan gum polymer, sodium chloride, and a sulfite group containing oxygen scavenger, is compared before and after the solution is boiled at atmospheric pressure for about five minutes. Where the additive is suitable the viscosity after boiling is at least about 75% of that before boiling. Typical results of boiling tests of various compounds are listed in Table 1.

Table 1

| | BOILING TEST |
|---|---|
| 1 | $Na_2S_2O_4$ |
| 2 | $Na_2SO_3$ |
| 3 | IPA* |
| 4 | THIOUREA* |
| 5 | ALLYL ALCOHOL* |
| 6 | CITRIC ACID |
| 7 | $SnCl_2$ |
| 8 | THIODIACETIC ACID* |
| 9 | 3,3'- THIODIPROPIONIC ACID* |
| 10 | MERCAPTOACETIC ACID* |
| 11 | ACRYLIC ACID* |
| 12 | ACRYLAMIDE |
| 13 | HYDROQUINONE |
| 14 | PYROGALLIC ACID |
| 15 | PROPYL GALLATE* |
| 16 | ALPHA-NAPHTHOL |
| 17 | $NaHSO_3$ |
| 18 | $Na_2S_2O_3$ |
| 19 | IBA* |
| 20 | METHANOL* |
| 21 | ETHYLENE GLYCOL* |

*Indicates the compound passed the "boiling test" by protecting Kelzan M.F. solution from drastic viscosity loss.
All samples contained 800 ppm Kelzan, NaCl and $Na_2SO_3$ except No. 1 which had 800 ppm $Na_2S_2O_4$ in place of the $Na_2SO_3$.

The anionic polysaccharide polymers, or Xanthan gum polymer, suitable for use in the present process, can be substantially any such materials produced by the fermentation of carbohydrates by bacteria of the genus Xanthomonas. In general, the anionic polysaccharide B-1459 is preferred. Examples of commercially available polymers comprise the Pfizer Xanthan Biopolymers available from Pfizer Chemical Company, the General Mills Xanthan Biopolymers available from General Mills Company, the Kelzan or Xanflood anionic polysaccharides available from Kelco Company, and the like.

The anionic polysaccharides used in the present process (and/or the fermentation broth in which they are made) are preferably treated with enzymes such as a proteinase to ensure the removal of (or destruction of) bacterial cells which may impede the flow of a solution into fine pores within subterranean earth formations. Alternatively such clarifications may be accomplished by or supplemented by means of centrification, filtration, and the like.

As known to those skilled in the art, in an oil recovery process in which fluids are displaced within a subterranean reservoir by injecting a viscosity enhanced aqueous solution, the effective viscosity (or reciprocal mobility within the reservoir) should be at least substantially equal to and preferably greater than that of the fluid to be displaced. In the present process, the concentration of anionic polysaccharide in such a solution should be in the order of about 100 to 2,000 parts by weight of polysaccharide per million parts by weight of aqueous liquid. Such concentrations generally provide viscosities in the order of from about 2 to 50 centipoises at room temperature, in a water containing about 400 parts per million total dissolved solids.

In the present process, the concentration of antioxidant can be relatively low, in the order of about 50 parts per million (weight per weight of aqueous liquid) and preferably from about 200 to 800 parts per million. The readily oxidizable alcohol or glycol concentration can be from about 50 to 2,000 parts per million, and preferably from about 500 to 1,000 parts per million. In general, the concentrations of the readily oxidizable alcohol or glycol and the polysaccharide polymer are preferably kept at least nearly equal (e.g., at least within about 10% of each other). Substantially fresh water solutions containing 800 parts per million Kelzan polysaccharide, from about 200 to 800 parts per million thiourea, and 500 to 1,000 parts per million isopropyl alcohol have retained from about 70–90% of their original viscosity after eight months storage at 97° C. (207° F.). In such storage tests, the best and most consistant results were obtained when the isopropyl alcohol and Kelzan concentrations were about equal and the thiourea concentration was about half the isopropyl alcohol concentration.

Stability in the presence of air was indicated by the following laboratory tests. Enzyme clarified solutions containing 1,000 parts per million Kelzan MF polysaccharide polymer (available from Kelco Company), 3,000 parts per million sodium chloride, 1,000 parts per million of each of sodium sulfite, isopropyl alcohol, 500 parts per million thiourea, and 20 parts per million Dowicide G (a polyhalogen phenolic bactericide available from Dow Chemical Co.) were stored at 97° C. In order to simulate the contacts with air which are likely to occur (due to leaks) in a waterflood oil recovery system in the field, 35 cc samples of the polymer solution were retained in bottles containing 1 cc of air above the liquid. The so-stored samples retained more than 80% of their initial viscosity after storage for seven months.

The drawing shows a graph of viscosity at 7.3 $sec^{-1}$, Brookfield, with time at 97° C. The curve labeled "Thiourea and IPA" relates to a basic test solution of 800 ppm of each of Kelzan MF polysaccharide polymer, sodium chloride and sodium sulfite in distilled water; which also contained 400 ppm thiourea and 800 ppm isopropyl alcohol. The curves labeled "No IPA", "No Thiourea" and "No Thiourea or IPA" relate to solutions in which the compositions were the same except for the indicated omissions. The unobviously beneficial synergistic stabilizing effect provided by the combination of the sulfur-containing antioxidant and the readily oxidizable alcohol are indicated by the retention of a viscosity of substantially 15 cps throughout the six-month test period.

In preparing an aqueous solution in accordance with the present process, the water should be deoxygenated before the other components are added. This avoids any chance that the anionic polysaccharide polymer, oxygen, and oxygen-scavenger will be mixed together within the solution. The antioxidant (and any antibacterial agent, or the like, to be used) can be added before, with, or after the anionic polysaccharide polymer. If the antioxidants are added before or simultaneously with the oxygen-scavenger they may be consumed in the reactions that ensue.

Antibacterial agents suitable for use in the present process can comprise sodium salts of tri- and pentachlorophenols, formaldehyde, aliphatic diamine salts and alkyldimethyl-benzylammonium chlorides.

Where suitable for the particular oil displacement procedure being used, an additional degree of viscosity stabilization of Xanthan gum polymer-thickened solutions can be obtained by adjusting the salt concentration of such a solution which has been treated in accordance with the present process. Table 2 shows typical results of the salt concentration effects on such solutions. It is apparent from the data in the table that an additional viscosity stabilizing effect is provided by the presence of from about 3600–25,000 ppm total dissolved salts which can include up to about 600 ppm multivalent cations. In general, the salt-enhanced stability is provided by from about 3600–50,000 ppm total dissolved salt that includes less than about 5000 ppm multivalent cations.

Table 2

SALT CONCENTRATION EFFECT

| Sample | Conc. Na$_2$SO$_3$ ppm | Percent "D" Sand Water | Initial $\eta$ | pH | Stored at 97° C. for Days | $\eta$ | pH |
|---|---|---|---|---|---|---|---|
| 190 | 800 | 3 | 36.9 | 8.5 | 49 | 7.7 | 7.5 |
| 200 | 800 | 5 | 36.7 | 8.3 | 41 | 12.6 | 6.9 |
| 201 | 800 | 8 | 37.1 | 8.3 | 41 | 38.7 | 6.8 |
| 191 | 800 | 10 | 37.9 | 8.2 | 110 | 36.7 | 6.8 |
| 192 | 800 | 20 | 39.2 | 8.1 | 111 | 39.8 | 6.6 |

All samples contained 1000 ppm Kelzan, 1000 ppm IPA, 500 ppm Thiourea, and 50 ppm Visco, 3201 Biocide. The Visco 3201 biocide is a mixture of tri- and pentachlorophenols, available from Nalco Corporation. the viscosities were measured at 25° C. using a Brookfield viscometer with U.L. adapter at 7.3 sec$^{-1}$.
"D" sand water contains about 120,000 ppm total dissolved salts which include about 3,000 ppm multivalent cations.

What is claimed is:

1. In an oil recovery process in which an aqueous solution which is thickened with a water-soluble Xanthan gum polymer is prepared in a surface location and injected into a subsurface reservoir, an improved process for preparing the thickened aqueous solution which comprises:
   first treating an aqueous liquid to remove substantially all dissolved oxygen; and, subsequently
   adding to the deoxygenated aqueous liquid at least one water-soluble sulfur containing antioxidant which is capable of protecting a Xanthan gum polymer solution from drastic loss of viscosity due to being boiled at substantially atmospheric pressure for about five minutes;
   adding to the deoxygenated aqueous liquid at least one water-soluble readily oxidizable alcohol or glycol which is capable of protecting a Xanthan gum polymer solution from drastic loss of viscosity due to being boiled at substantially atmospheric pressure for about five minutes;
   each of said capabilities of protecting the Xanthan gum polymer solutions being demonstrable by the protecting of the viscosity of a water solution, which solution contains 800 ppm of each of the additives being tested, Xanthan gum polymer, sodium chloride and a sulfite group-containing oxygen scavenger, with said solution being protected to the extent that at least about 75% of the viscosity exhibited before the boiling is exhibited after the boiling; and
   adding to the deoxygenated aqueous liquid at least one water-soluble Xanthan gum polymer produced by the fermentation of carbohydrates by a bacteria of the genus Xanthomonas.

2. The process of claim 1 in which the thickened aqueous liquid solution is injected into the oil-containing subterranean formation to displace fluid toward a production well or location from which fluid is produced.

3. The process of claim 1 in which the treating of the aqueous liquid to remove oxygen includes the addition of enough strong reducing agent to remove substantially all of the oxygen.

4. The process of claim 3 in which the reducing agent is a water-soluble compound that contains or forms ions that contain an SO$_3$-group.

5. The process of claim 3 in which the reducing agent is an alkali metal sulfite or bisulfite.

6. The process of claim 1 in which the deoxygenated aqueous liquid contains from about 3600–50,000 ppm total dissolved salt and less than about 5,000 ppm multivalent cations.

7. The process of claim 1 in which the antioxidant is thiourea and the alcohol is isopropyl alcohol.

8. The process of claim 7 in which the Xanthan gum polymer is clarified by reacting it with a proteinase.

9. The process of claim 8 in which the aqueous liquid is deoxygenated by treating it with an alkali metal sulfite or bisulfite.

10. In a process in which a Xanthan gum polymer-thickened aqueous solution is flowed into a relatively remote location in which the solution viscosity may be decreased by a relatively long exposure to a relatively high temperature, an improved process for preparing the thickened aqueous solution which comprises:
    first treating an aqueous liquid to remove substantially all dissolved oxygen, and subsequently
    adding to the deoxygenated aqueous liquid at least one water-soluble sulfur containing antioxidant capable of protecting a Xanthan gum polymer solution from drastic loss of viscosity due to its being boiled at substantially atmospheric pressure for five minutes;
    adding to the deoxygenated aqueous liquid at least one water-soluble readily oxidizable alcohol or glycol capable of protecting a Xanthan gum polymer solution from drastic loss of viscosity due to its being boiled at substantially atmospheric pressure for five minutes;
    each of said capabilities of protecting the Xanthan gum polymer solutions being demonstrable by the protecting of the viscosity of a water solution, which solution contains 800 ppm of each of the additives being tested, Xanthan gum polymer, sodium chloride and a sulfite group-containing oxygen scavenger, with said solution being protected to the extent that at least about 75% of the viscosity exhibited before the boiling is exhibited after the boiling; and adding to the deoxygenated aqueous liquid at least one Xanthan gum polymer produced by the fermentation of carbohydrate by a bacteria of the genus Xanthomonas.

11. The process of claim 10 in which the deoxygenated aqueous liquid contains from about 3600–50,000 ppm total dissolved salt and less than about 5,000 ppm multivalent cation.

12. The process of claim 10 in which the aqueous liquid is deoxygenated by treating it with an alkali metal sulfite or bisulfite.

13. The process of claim 10 in which the antioxidant is thiourea and the alcohol is isopropyl alcohol.

14. The process of claim 13 in which the aqueous liquid is deoxygenated by treating it with an alkali metal sulfite or bisulfite.

15. In an oil recovery process in which an aqueous solution which is thickened with a water-soluble Xanthan gum polymer is prepared in the surface location and injected into a subsurface reservoir, an improved process for preparing the thickened aqueous solution which comprises:
   first treating an aqueous liquid to remove substantially all dissolved oxygen; and, subsequently,
   adding to the deoxygenated aqueous liquid at least one water-soluble sulfur containing antioxidant which is capable of protecting a Xanthan gum polymer from drastic loss of viscosity due to being boiled at substantially atmospheric pressure for about five minutes and is at least one member of the group consisting of thiourea, thiodiglycolic acid, dithiodiglycolic acid and their water-soluble homologs;
   adding to the deoxygenated aqueous liquid at least one water-soluble readily oxidizable alcohol or glycol which is capable of protecting a Xanthan gum solution from drastic loss of viscosity due to being boiled at substantially atmospheric pressure for about five minutes and is at least one member of the group consisting of methanol, ethanol, allyl alcohol, isopropyl alcohol, isobutyl alcohol and ethylene glycol; and
   adding to the deoxygenated aqueous liquid at least one water-soluble Xanthan gum polymer produced by the fermentation of carbohydrates by a bacteria of the genus Xanthomonas.

16. In a process in which a Xanthan gum polymer-thickened aqueous solution is flowed into a relatively remote location in which the solution viscosity may be decreased by a relatively long exposure to a relatively high temperature, an improved process for preparing the thickened aqueous solution which comprises:
   first treating an aqueous liquid to remove substantially all dissolved oxygen, and subsequently
   adding to the deoxygenated aqueous liquid at least one water-soluble sulfur-containing antioxidant capable of protecting a Xanthan gum polymer solution from drastic loss of viscosity due to its being boiled at substantially atmospheric pressure for five minutes and is at least one member of the group consisting of thiourea, thiodiglycolic acid, dithiodiglycolic acid and their water-soluble homologs;
   adding to the deoxygenated aqueous liquid at least one water-soluble readily oxidizable alcohol or glycol capable of protecting a Xanthan gum polymer solution from drastic loss of viscosity due to its being boiled at substantially atmospheric pressure for five minutes and is at least one member of the group consisting of methanol, ethanol, allyl alcohol, isopropyl alcohol, isobutyl alcohol and ethylene glycol; and
   adding to the deoxygenated aqueous liquid at least one Xanthan gum polymer produced by the fermentation of carbohydrate by a bacteria of the genus Xanthomonas.

* * * * *